Patented July 1, 1930

1,769,519

UNITED STATES PATENT OFFICE

GEORGE D. KING AND ROGER H. STITT, OF CHICAGO, ILLINOIS, ASSIGNORS TO UNITED STATES GYPSUM COMPANY, OF CHICAGO, ILLINOIS, A CORPORATION OF ILLINOIS

ACOUSTICAL MATERIAL AND METHOD OF MANUFACTURING SAME

No Drawing.    Application filed April 15, 1929. Serial No. 355,419.

This invention relates to sound absorbing or acoustical material and the method of manufacturing same and has reference more particularly to sound absorbing compositions molded into the form of slabs or tile, together with the particular method of preparing these tile.

In the preparation of the sound absorbing composition and molded articles such as slabs, tile, etc., as described in the copending application of George D. King, Serial No. 355,420 filed April 15, 1929, it is desirable to mix the ingredients of the composition in a correct manner so that the ingredients thereof will not so react as to defeat the purpose of the composition. The preparation of the slabs or tiles for ultimate use on the walls or ceilings of buildings, is also a salient feature of our invention.

An object of this invention, therefore, is to prepare molding compositions of sound absorbing nature in such a way that the ingredients of the composition will be properly compounded.

Another object of the invention is to so prepare the molded articles such as slabs, tile, etc., for use on walls and ceilings of buildings that their maximum acoutical or sound absorbing properties will be developed, and so that these articles will be pleasing to the eye and will be practical materials for construction and decoration.

A further object is to prepare the molded articles by an economical and practical method of manufacture; also to improve sound absorbing articles and their methods of manufacture in other respects hereinafter specified and claimed.

As a fibrous base for the improved composition, mineral wool is preferred because of its non-wilting or water resistant character of the individual fibers, great connected porosity resulting in superior sound absorbing qualities, and also because of its fireproof and vermin-proof nature. Especially good results were had in the use of a special form of mineral wool, known as granular mineral wool. This is mineral wool in the shape of highly porous little balls of rather irregular shape, and of the size of a pea or larger. This granular wool is made by mechanically processing regular wool and is procurable on the market, being familiarly known as "granulated mineral wool." Wool put into this form by any process that gives wool of this character is suitable for the purpose of this composition. The granular wool is pourable and free-running, somewhat like cottonseed or corn kernels, whereas the regular wool is matted or felted and is more like cotton in character. The use of granular wool in the composition makes it easier to dry mix, and wet mix and easier to mould into tile or apply as paint or plaster. It should be understood, however, that other fibrous materials, especially if formed into granules, may be substituted as a base for the composition, such as wood or other cellulose fibers or other light weight material which is suitable.

The other ingredients in this acoustical composition are:—

1. A binder. For this a cooked, thick-boiling starch gel is preferred. Another adhesive that may be used with good results is a mechanically modified corn or wheat flour such as is used in foundry cores; for example the partially dextrinized paste on the market. Such a corn or wheat flour may be used in a dry mix of the ingredients for use as a paint or plaster, gauging water being added on the job.

2. An agent to give plasticity to the composition on mixing with water. Such plasticity enables rapid and easy mechanical formation of the tile, etc., and more practical application of the paint or plaster. For this Karaya gum is preferred. If cooked starch is used in the composition it will largely serve this purpose, but it is preferable to use some of the gum gel even in such mixes, as the gum improves the plasticity and workability of the composition. Karaya gum is similar to tragacanth gum in that it is capable of absorbing large amounts of water (as high as 50 parts water to 1 part gum by weight) forming a syrupy but not very sticky solution.

3. An agent to give water resistance. For this I prefer to use an albuminous substance such as blood albumin or animal glue, coupled with a salt such as copper sulfate. In a dry mixture of the ingredients for job use, the animal glue is preferable. A casein glue may be used. Some other salts may be substituted for the copper sulfate such as lead acetate or mercuric chloride. Aluminum sulfate, formaldehyde or potassium dichromate do not give good results.

Preferable but not essential ingredients are:—

4. A mineral filler to reduce the tendency of the binder to smolder on burning. Pyrophyllite is preferred because of its large bulk.

5. A preservative such as beta naphthol, alpha naphthylamine, etc. The copper sulfate also acts as a preservative.

6. Coloring matter such as raw sienna, iron oxide pigments, etc.

The preferred formula for the composition as described in the aforementioned King application is as follows:—

| | |
|---|---|
| Globe pearl starch | 5½ lbs. |
| Karaya gum | 1¼ lbs. |
| Raw sienna | 10 ozs. |
| Pyrophyllite | 3 lbs. |
| Beta naphthol | ½ oz. |
| Copper sulfate | 8 ozs. |
| Light blood albumin | 1 lb. |
| Granulated mineral wool | 56 lbs. (4 cu. ft.) |

Water sufficient to give the desired plasticity.

The process of forming the tile or slabs from the composition is divided roughly into five parts:—
(1) Preparing the ingredients.
(2) Wet mixing.
(3) Molding.
(4) Drying.
(5) Finishing.

If the modified corn flour is used instead of the cooked starch gel and if a cold water soluble animal glue is used instead of the albumin, a dry mixture may be made of all the ingredients and therefore step (1), preparing the ingredients would consist only of dry mixing them.

Below, however, is given a preferred procedure for plant molded tile, slabs, etc.

1. Preparing the ingredients (a) The cooked starch gel is made by bringing to boiling the starch in 125 lbs. of cold water, with preferably some stirring.

(b) A fluid gel-like solution is made by adding to 45 lbs. of cold water during fast agitation, the karaya gum, pyrophyllite and raw sienna.

(c) A solution is made of the copper sulfate and beta naphthol in 5 lbs. of warm water.

(d) The blood albumin is soaked in 8 lbs. of cold water for several hours and then stirred into solution.

In making up the composition, solutions (a) and (b) are mixed thoroughly. Then the solution (d) is added to the mixture of (a) and (b). Solution (c) is now added. The temperature of the mix should not be over 150° F. The result of the above process is a fluid, viscous, gel-like mixture. The insoluble constituents are temporarily suspended in the gel. Satisfactory variations to this method of forming the mixture may be devised by anyone familiar with the ingredients.

2. Wet mixing

This operation is important and will govern to a large extent the character of tile, etc., obtained. The liquid mixture, prepared in (1), and the mineral wool are added together in a suitable mixing vessel. This may be a metal bowl or half-cylinder of sufficient size as to comfortably contain the batch, and fitted with blades of a nature to cut thru and partially turn the mass. The speed of mixing should be low (say 100 R. P. M.) so as to not unnecessarily break down the fibers or densify the mass. If granulated mineral wool is used, a shorter mixing time is generally necessary than when the regular matted long fiber wool is used. If a tile of very uniform texture and color is desired the time of mixing should be increased. By a shorter mixing time a tile of more irregular and rougher structure, but greater sound absorption can be obtained.

If granulated wool is used and if the mass is not mixed too long, the face of the resulting tile is composed of numerous soft spots consisting of the balls of mineral wool which have not been materially penetrated by the binding agent, these balls being separated by a harder skeletonized structure containing a larger percentage of the binding material. The soft spots, the harder skeleton structure and the valleys or interstices between the granules have different sound absorbing qualities. Thus by regulating the degree of wet mixing, the sound absorption at the different pitches and the appearance of the tile can be largely controlled. If by mixing a short time only or by adding the coloring matter as a separate slurry, the coloring matter is mixed in to a degree so that only part of the granules of mineral wool will be penetrated by the color, the faces of the resulting tile, after finishing, will present a beautiful variegated or mottled appearance, of colored and uncolored areas. This surface resembles natural stone in appearance and yet is of a high degree of connected porosity and sound absorption.

3. Molding

As a result of the wet mixing, a plastic, workable mass is obtained. This enables it to be converted into desirable shapes or forms by simple molding, no pressure being necessary. The tile, etc., should be molded preferably without pressing out any appreciable amount of the liquid or densifying the mass, so that when the tile dries out, it will be light in weight and highly porous. While tile made in this way have good strength, tile of greater strength and greater density may be made by molding with some pressure.

The plastic mass may be molded into any suitable forms either by hand or by machinery, such as by use of traveling molds, a master roll for leveling off, etc. Perforated metal plate forms may be used to facilitate later drying, burlap being used on the bottom of the molds for backing the plastic mass. In place of the burlap, other open mesh fabric may be used. The mass is screeded off to the top of the form by hand screeds, master roll, etc. It is at times desirable to produce a tile having a rougher, more stone like appearance. This may be done by screeding with the edge of the screed and, instead of passing smoothly over the mass, dragging up some of the wool, resulting in rather large fissures or valleys in the surface and extending into the tile interior.

4. Drying

The molded slabs in the forms are introduced into suitable driers such as are used for drying gypsum board or fiber wallboard. The drying should not be too fast, so as to prevent excessive shrinkage. The temperature should not be so high as to burn or scorch the binders in the slab, but should be high enough to get full benefit from the waterproofing action of the blood albumin and copper sulfate as heat seems to further complete the reaction between these two agents. A temperature of 200°–250° F. is satisfactory.

5. Finishing

After the slabs are dry, they are removed from the molds. The burlap may be stripped off or may be left on the slab as a permanent backing. The slab is then cut into the desired finished sizes with a saw, carborundum wheel or otherwise. One surface of the tile or slab is then buffed or ground by suitable means so that the outer surface of the tile is removed and the more porous interior is exposed. This interior also presents a more pleasing texture and color, as the outer surface is marred by some of the binder, waterproofer, etc. which has migrated to the surface during drying. Suitable means for removing the surface are a carborundum roll, a sanding belt, a planer, sand-blasting apparatus, etc. The opposite side of the tile may be buffed or ground slightly to level it up if desired. The tile or slab is then further shaped up into the design desired, beveling, etc. by means of a saw, carborundum wheel, or otherwise. It is desirable to blow the dust accumulated by the sanding from the surface of the tile. If the composition is used as a plaster or paint, it is preferable in this case also to sand off the surface so as to expose the more porous interior.

The preferred formula for molding into tile, slabs, etc., shows upon test of the tile of $\tfrac{3}{4}$ inch thickness, the following approximate sound absorption:—

| Pitch | $C_2$ | $C_3$ | $C_4$ | $C_5$ | $C_6$ | $C_7$ |
|---|---|---|---|---|---|---|
| Absorption | .11 | .30 | .53 | .70 | .53 | .53 percent |

The tile may be attached to walls or ceilings by suitable adhesives or by mechanical means. The surface of the applied tile may be cleaned by refinishing the surface by sandpapering or other similar manner.

Treatment of walls and ceilings of buildings with this composition not only results in valuable acoustical correction but also furnishes in itself a pleasing decoration without further treatment. However, if desired, the tile may be surface treated with a stain, etc. so that the pores of the tile will not be filled or covered.

We would state in conclusion that while the foregoing description represents a practical embodiment of our invention, we do not wish to limit ourselves precisely to these details since, manifestly, the same may be considerably varied without departing from the spirit of the invention as defined in the appended claims.

Having thus described our invention, we claim as new and desire to secure by Letters Patent:—

1. The method of preparing a colored, porous sound-absorbing material which includes mixing integrally a colored pigment with a base of fibrous material, a binder and water, forming into the desired shape, drying, and removing the surface so as to expose the porous interior.

2. The method of forming an acoustical tile which includes mixing granular mineral wool, a binding agent, a waterproofing agent and a gel to form a plastic mass, molding the mass into articles of predetermined shape, drying, and mechanically finishing the surface of said article.

3. The method of preparing a sound absorbing material which includes mixing a fibrous material and a binder, forming into the desired shape, drying and removing the outer surface of the molded composition so as to expose the interior.

4. The method of preparing a sound absorbing material which includes mixing a base of fibrous material with a binder and water so that only part of the fibrous material is penetrated by the binder, molding into articles, drying and finishing.

5. The method of preparing a sound absorbing material which includes mixing a base of granular, porous fibrous material with a binder, a coloring pigment and water so that only part of the granules are penetrated by the color, molding, drying, and finishing the surface of the product to form a variegated, mottled appearance.

6. The method of preparing a sound absorbing material which includes mixing a base of fibrous material with a binder and water, molding and screeding the surface so that the particles of the fibrous material near the surface are pulled apart resulting in deep fissures in the surface, these fissures giving the finished tile a rough, natural stone-like appearance, and increased absorption area, drying and buffing off the surface.

7. The method of preparing a sound absorbing material which includes mixing a base of granular mineral wool with a binder, molding onto a fabric backing, drying, and trimming into the desired size.

8. The method of preparing a sound absorbing material which includes mixing a base of granular mineral wool with a binder and water, molding onto a fabric backing, drying, stripping off the fabric, and finishing.

9. The method of preparing a colored sound absorbing material which includes mixing integrally a coloring pigment with a base of mineral wool, a binder and water, forming into the desired shape, drying, and sanding off the surface.

10. The method of preparing a sound absorbing material which includes making a mixture of fibrous material, water, a binder, an albuminous substance and copper sulfate, molding this mixture, drying at a temperature high enough to increase the efficiency of the waterproofing action of the albuminous substance and copper sulfate, and finishing the molded product.

11. The method of preparing a sound absorbing material which includes making a fluid gel with starch, adding a solution of an albuminous substance, adding a solution of copper sulfate, molding the plastic mass, drying at approximately 200°–250° F., and removing the outer crust on the surface of the product.

12. The method of preparing a sound absorbing material which includes mixing a base of granular fibrous material with a binder and water, the mixing being carried on in such a manner and to such a degree that the granules are not appreciably broken up but remain as separate entities so that the resulting finished product will be of a granular appearance with valleys between some of the granules, molding, drying and finishing.

13. The method of preparing a sound absorbing material which includes mixing mineral wool with water, a binder, a coloring pigment, and a waterproofer, the mixing being carried on intensively so that the mass is uniform in color and texture and so that the wool is thoroughly penetrated by the binder and the mass is smooth and characterized by a lack of granular appearance, molding the mass, drying, finishing.

14. The method of preparing an acoustically absorbent tile which includes mixing a plasticizing gel binder, a waterproofing agent and granular mineral wool to form a plastic mass, molding said plastic mass into slabs, perforated plates being used as the bottoms of the molds so that drying will take place from both surfaces, drying, and subdividing said slabs by cutting into sound absorbing tiles.

15. The method of preparing acoustically absorbent tile which includes mixing a gel binder, a waterproofing agent, and granular mineral wool to form a plastic mass, molding said mass into slabs, drying the slabs from both surfaces so as to prevent warping, subdividing said slabs by cutting into sound absorbing tile, and beveling the edges of said tile.

16. An acoustically absorbent tile composed of a composition molded in plastic form and containing mineral wool, a binding agent, a waterproofing agent, and a gel, said tile having a sound absorbing, mechanically finished surface.

17. The method of improving a sound absorbing porous, molded tile of fibrous material which includes removing the outer surface to expose the porous interior.

18. The method of preparing a sound absorbing material which includes mixing granulated mineral wool with a gel-like mixture of cooked starch, karaya gum, pyrophyllite, blood albumin, copper sulfate, beta naphthol, and raw sienna to form a plastic mass, molding this plastic mass in forms to form molded articles of predetermined shape drying, cutting into desired sizes, removing the surface of the article to expose the porous interior, blowing dust out of the pores of the surface and beveling the edges of the article.

GEORGE D. KING.
ROGER H. STITT.